J. MENGE.
ROTARY PUMP.
No. 11,214. Reissued Dec. 29, 1891.
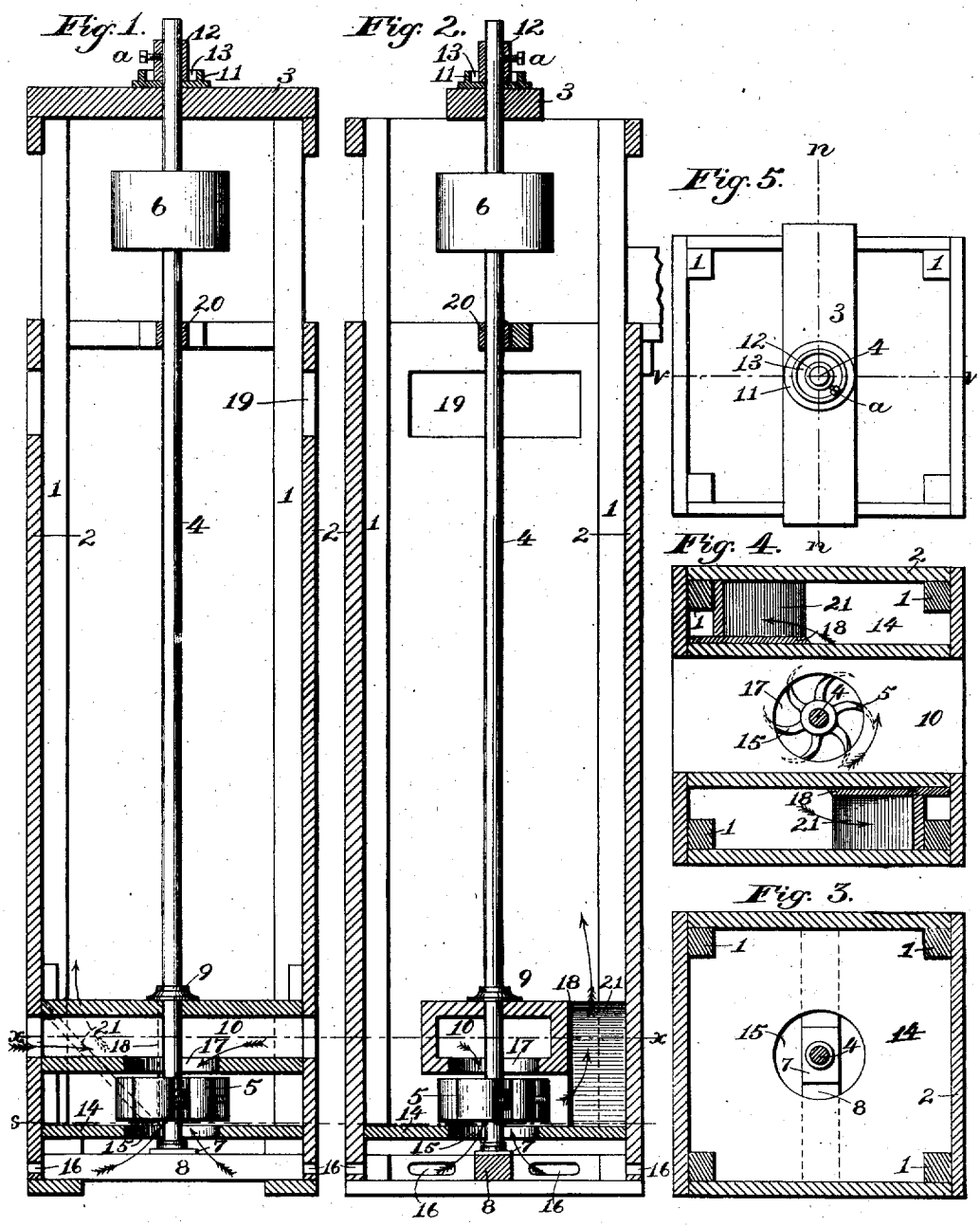
Witnesses;
Percy C. Bowen
J. C. Wilson
Inventor,
Joseph Menge,
By Whitman & Wilkinson
Attorneys.

UNITED STATES PATENT OFFICE.

JOSEPH MENGE, OF NEW ORLEANS, LOUISIANA.

ROTARY PUMP.

SPECIFICATION forming part of Reissued Letters Patent No. 11,214, dated December 29, 1891.

Original No. 421,415, dated February 18, 1890. Application for reissue filed September 11, 1891. Serial No. 405,429.

*To all whom it may concern:*

Be it known that I, JOSEPH MENGE, a citizen of the United States, residing in the city of New Orleans, parish of Orleans, State of Louisiana, have invented a new and useful Single-Piston Rotary Pump, of which the following is a specification.

My invention relates to improvements in rotary pumps; and it consists of the novel features hereinafter described and claimed.

Reference is had to the accompanying drawings, wherein the same parts are indicated by the same letters and figures.

Figure 1 is a vertical section of pump on plane N N, Fig. 5. Fig. 2 is a vertical section of pump on plane V V, Fig. 5. Fig. 3 is a horizontal section on plane S S, Figs. 1 and 2. Fig. 4 is a horizontal section on plane X X, Figs. 1 and 2. Fig. 5 is a plan view of top of my pump.

Similar letters and figures refer to similar parts throughout the several views.

The pump-box may be constructed of either wood or iron. If of the former, the construction consists of four corner-posts, to which the box sides 2 are secured, which sides are of tongued and grooved flooring. These sides 2 extend from the bottom up to and above the discharge-opening 19. The posts 1 extend above the sides 2 to receive the timbers 3 for the support of upper end of driving-shaft 4. The driving-shaft 4, to which are secured the wheel 5 and driving-pulley 6, rests in step 7, secured to the timber 8, placed in bottom of pump-box. This driving-shaft 4 extends the whole length of the box and is guided by the journal-boxes 9, 11, and 20. The bearing 11 is formed with a central recess 13 to serve as an oil-well, and the floor of which serves as a bearing for the lower end of the adjustable collar 12 on the driving-shaft, secured thereto by means of a set-screw *a*. By moving the collar on the shaft and securing it at the required line the shaft may be used in boxes of different heights or the variations of wear compensated for.

Near the bottom of the pump-box is placed a tight floor 14, in which is cut a circular opening 15 directly under the rotary wheel 5, which forms the bottom suction. The water reaches this suction from the bottom of box and through the openings 16.

Above the rotary wheel and running across the pump-box is placed a tight box or suction 10, with a circular hole 17 in the bottom of the box directly over the rotary wheel 5, as shown. This box or suction 10 is cut through the sides of the pump-box and receives the water to form the top suction. A vertically-arranged plank 18, provided with a beveled edge, is placed and secured in diagonally-opposite corners of pump-box and at the bottom of box. A flooring 21 is placed on an incline between this plank 18 and sides of pump-box, as shown in Fig. 4 and in dotted lines in Fig. 1.

The operation of the pump is as follows: The pump-box, fitted up as described, is set into the water to a depth at least sufficient to cover the openings into the upper suction-box 10, when the box is thoroughly braced and connected to the motor by the belt running on the pulley 6, which revolves the rotary wheel 5. This rotary wheel throws the water contained between the blades off radially in every direction, creating a vacuum, which is filled by water running in through the circular suction-openings 15 and 17. The water would be given a motion which is the resultant of two motions—namely, a rotary motion or one tangential to the periphery of the rotating wheel and a centrifugal motion in the prolongation of the radii—and the combination of these two motions would cause the water to churn around in the pump-box to the material loss of power were it not for the plank 18 and incline 21. The plank 18 planes, as it were, the water off from the edge of the wheel and directs it into the inclined passages, where the inclined planes 21 wedge the water in motion upward, converting much of the ordinarily lost motion into efficient work. By the continued action of the rotary wheel the water is forced up into the pump-box until it flows out of the discharge-opening 19, where it is conducted to the desired point by pipe or flume.

It will be seen that the wheel 5 is a free wheel—that is, it is free to throw water off peripherally in every direction, and there is no intermittent action, for every blade is continuously doing its own work independently of all the others, while the spaces between the blades are open top and bottom and radially, in these features differing, essentially, from the various pumps of somewhat similar construction now in use. By these features great economy in operation is obtained, for the loss of power due to friction and compressive strains in narrow and tortuous passages is done away with and great efficiency is obtained.

Having thus described my invention, what I claim, and desire to secure by Letters Patent of the United States, is—

1. In a rotary pump, the combination, with a suitable casing, of a wheel free from contact with its case and constructed with wings or blades open top and bottom and radially, said wheel rotating between two parallel plane surfaces and adapted to throw off water freely in the direction of all the radii of the said rotating wheel, substantially as described.

2. In a rotary pump, the combination, with a suitable casing, of a wheel free from contact with said casing and constructed with wings or blades open top and bottom and radially, said wheel rotating therein, with suction-openings in said casing at either side of said wheel, substantially as described.

3. In a rotary pump, the combination, with a suitable casing, of a wheel free from contact with said casing and constructed with wings or blades open top and bottom and radially, said wheel rotating between two parallel plane surfaces and adapted to throw off water freely in the direction of all the radii of the said rotating wheel, with suction-openings in said casing at either side of said wheel, substantially as described.

4. In a rotary pump, the combination, with the pump-casing having a circular opening in the bottom, of the rotary wheel free from contact with the casing, having wings or blades open top and bottom and radially, said wheel being mounted on a vertical shaft over the said opening in the casing, and a suction-box arranged over the rotary wheel and having a circular opening in its bottom, substantially as described.

5. In a rotary pump, the combination, with a rectangular box forming the pump-casing and having a bottom 14, and central water-opening 15 in said bottom, of the wheel free from contact with the casing and mounted on a vertical shaft over the said opening, said wheel having blades open top and bottom and radially and a rectangular suction-box 10, arranged over the wheel and having a circular opening in its bottom over the said wheel and ends opening through the sides of the pump-casing, substantially as described.

6. In a rotary pump, the combination, with the pump-casing having a circular opening in the bottom, of the wheel mounted on a vertical shaft over the said opening in the casing, a suction-box arranged over the wheel and having a circular opening in its bottom, inclined floorings arranged in diagonally-opposite corners of the pump-box, and vertically-arranged deflecting-planks secured to the inner sides of the inclined floorings, substantially as described.

7. In a rotary pump, the combination, with the pump-casing provided with a bottom 14, having a central water-opening 15, of the wheel mounted on a vertical shaft over the said opening, a suction-box 10, arranged over the wheel, having an opening in its bottom and its ends opening through the sides of the pump-casing, and inclined water-ways arranged in diagonally-opposite corners of the pump-box and extending from the bottom of the pump-casing to the top of the suction-box, substantially as described.

In testimony whereof I have affixed my signature in the presence of two witnesses.

JOSEPH MENGE.

Witnesses:
JOHN C. WILSON,
PERCY C. BOWEN.